United States Patent [19]

Caruel et al.

[11] 4,104,874

[45] Aug. 8, 1978

[54] DOUBLE-WALLED COMBUSTION CHAMBER SHELL HAVING COMBINED CONVECTIVE WALL COOLING AND FILM COOLING

[75] Inventors: Jacques E. J. Caruel, Dammarie les Lys; Guy D. Stora, Melun, both of France

[73] Assignee: Societe Nationale d'Etude et de Construction de Moteurs d'Aviation, Paris, France

[21] Appl. No.: 764,655

[22] Filed: Feb. 1, 1977

[30] Foreign Application Priority Data

Feb. 6, 1976 [FR] France .................................. 76 03921

[51] Int. Cl.$^2$ ............................................. F02C 7/18
[52] U.S. Cl. .................................. 60/39.65; 60/39.66; 431/351; 431/353
[58] Field of Search ........................... 60/39.65, 39.66; 431/351-353

[56] References Cited

U.S. PATENT DOCUMENTS

| 2,958,194 | 11/1960 | Bayley | 60/39.66 |
|---|---|---|---|
| 3,360,929 | 1/1968 | Drewry | 60/39.66 |
| 3,545,202 | 12/1970 | Batt et al. | 60/39.66 |
| 3,899,876 | 8/1975 | Williamson | 60/39.66 |
| 3,899,882 | 8/1975 | Parker | 60/39.66 |
| 3,978,662 | 9/1976 | Dubell et al. | 60/39.66 |

Primary Examiner—Robert E. Garrett
Attorney, Agent, or Firm—Bacon & Thomas

[57] ABSTRACT

A combustion chamber shell, particularly for aircraft turbojet engines, consisting of an assembly of sleeves each of which comprises two parallel facings connected and braced to each other by multiple longitudinal ribs which form an equal number of channels for the passage of the cooling air. The sleeves are connected to each other by annular parts which, to the front and to the rear of the sleeve facings, form vents which are arranged with respect to each other in such a fashion that the air entering into the chamber through the said channels flows in them from rear to front.

3 Claims, 4 Drawing Figures

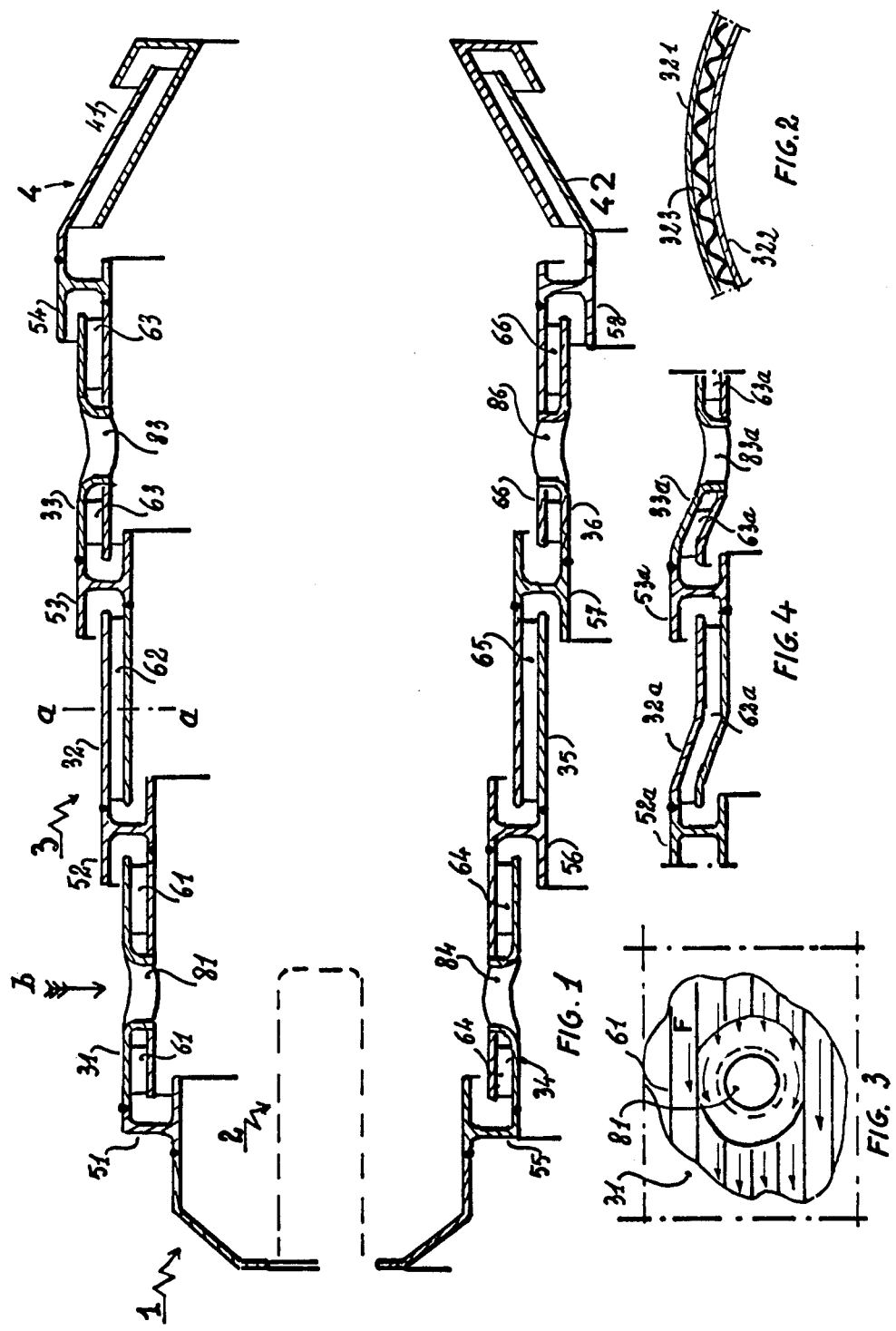

DOUBLE-WALLED COMBUSTION CHAMBER SHELL HAVING COMBINED CONVECTIVE WALL COOLING AND FILM COOLING

BACKGROUND OF THE INVENTION

In prior constructions the combustion chambers of turbojet engines, whose section perpendicular to the direction of the gaseous flow is approximately annular or circular, are contained within a housing having intake vents for air supplied by the compresser. The space inside the chamber shell, called the flame tube, contains the fuel injection devices and the primary combustion air intake vents at its front (upstream) end and similar vents for admitting the post-combustion and/or dilution air at its rear (downstream) end.

Since the inner surface of the wall or walls of the chamber shells are subjected to an intense heat flow generated by the radiation from the flames and the convection of the combustion gases flowing from front to rear, it is advantageous to utilize a portion of the secondary air flow, that is, of the air flow which fulfills functions other than combustion, to effect the thermal protection of the said walls. Such protection by a portion of the secondary air flow may be achieved by two procedures which, moreover, can often be used simultaneously to advantage. The first of these procedures calls for cooling by external convection; that is, the heat of the wall is dissipated by the flow of secondary air flowing from front to rear around its outer surface. The second, often called "film cooling", calls in addition for the heat-shield effect; air vents or intake ports in the walls distribute a portion of the secondary air flow along their inner surface in the form of a surface layer which prevents direct contact between the surface and the combustion gases. This layer, which becomes diluted as it progresses from front to rear, must be renewed by means of intakes of secondary air successively distributed throughout the length of the chamber.

The high compression at which modern jet turbines operate has significantly complicated the problem of cooling the chamber shell walls, since, as compression increases, so does the intake temperature of the secondary air (600° C for a compression ratio of 30) and the thrust of the combustion gases, which is a function of their pressure.

Several approaches are known for improving the protection of the walls.

The first consists of multiplying the number of surface air inlets, so as to increase the flow of such air and renew it more frequently. This approach is limited by the fact that the flow of secondary air cannot exceed a fraction equal to 30% to 35% of the total flow; otherwise, the flow of primary air, whose relative value must increase in proportion to the turbine intake temperature — which has been rising in the present trend — becomes insufficient, and so, moreover, does the flow of secondary dilution air.

Another approach consists of accelerating the heat exchange by convection by increasing the speed, and thus the flow rate, of the portion of the flow of secondary air which goes around the chamber. This rate of flow is quickly limited, however, by increased pressure losses and the impossibility of correctly feeding intake vents of very large dimensions.

Still another approach, which also is intended to accelerate the exchange of heat by convection, consists of enlarging the exchange surfaces. One may, for example, equip the outer surfaces of the walls with fins, but the construction of such fins becomes difficult. One may also build the chamber shell out of double-walled sections, that is, wherein the wall or walls consists of two facings and the facings of each wall ection are joined to each other by ribs which form braces aligned in the direction of the flow and delimit longitudinal channels opening into the space between the housing and the chamber at the front and into the chamber at the rear, so that the same current of air flows first through the channels to cool one section by convection and then along the inner face of the following section to cool it by "film cooling". However, the double-wall arrangement requires very large air flows in order for a significant convection effect to be obtained.

All the approaches described above to achieve convection cooling present a major drawback: the convective fluid flows from the front to the rear and gets hot along its path in contact with a wall whose temperature itself increases from front to rear because of the progressive dilution of the film cooling effect.

SUMMARY OF THE INVENTION

This invention pertains to combustion chambers of the so-called double-walled type, wherein the shell wall or walls consist of two facings connected to and kept at a distance from each other by bracing elements. More specifically it pertains to combustion chambers for turbojet engines, particularly for aircraft turbojet engines.

The purpose of the invention is to provide a double-wall arrangement for combustion chamber shells which is exempt from the above-mentioned drawbacks.

The combustion chamber shell according to the invention, which consists of at least one section of which at least one wall has a double facing (a single cylindrical wall if the chamber has a cylindrical cross-section and two concentric cylindrical walls if the chamber has an annular cross-section), the facings of the said wall being connected to each other by longitudinal ribs which form braces and delimit longitudinal channels through which the cooling gas flows, is characterized by the fact that the channels begin at an intake opening which faces frontwards (upstream) into a region of the space between the chamber and the housing located toward the rear (downstream) end of the section and emerge at an opening which faces rearwards (downstream) into a region of the internal space of the chamber located toward the front (upstream) end of the section.

BRIEF DESCRIPTION OF THE DRAWINGS

Other provisions, as well as the advantages deriving from the invention with regard to the effectiveness of the cooling and to the simplicity and rigidity of the construction of the chamber shell, will be mentioned in the succeeding description, in which reference is made to the appended drawings, in which:

FIG. 1 is a half-section, along an axial plane, of an annular combustion chamber shell according to the invention;

FIG. 2 is a partial cross-section along the plane a-a of FIG. 1;

FIG. 3 is a partial view in the direction b of FIG. 1; and

FIG. 4 is a partial view of a half-section, along an axial plane, of an annular combustion chamber shell according to a variant of the invention.

DESCRIPTION OF THE PREFERRED EMBODIMENTS

In order to prevent any confusion, it will be advisable to designate, within each annular chamber shell section, the sleeve with the larger diameter (the term "diameter" meaning, unless otherwise indicated, average diameter) as the "outside sleeve" and the sleeve with the smaller diameter as the "inside sleeve". Since each sleeve contains two facings, the facing which delimits the space enclosed within the chamber, namely the flame tube, will be called the "inner facing" and that which faces the space outside the chamber will be called the "outer facing". It is stressed, furthermore, that although the example described pertains to an annular chamber, the invention evidently applies to cylindrical chambers as well.

FIG. 1 is to be considered first. The annular chamber it depicts contains, in the known manner, an annular front head 1 supporting burners arranged in a ring, such as burner 2. The burner support elements are not shown, and neither are the annular housing surrounding the chamber nor the elements which secure the chamber to the turbojet engine. The front head 1 is followed, in the front-to-rear direction of the gas flow, by an annular chamber shell 3 with a divergent axial section and by a convergent combining nozzle 4 which delivers the gases to the turbine, which is not depicted.

The chamber shell 3 consists of three outside sleeves 31, 32 and 33, which are double-walled, or, more precisely, have two facings, and which have increasing diameters from front to rear, and of three inside sleeves 34, 35 and 36, which also have two facings and whose diameter decreases from front to rear. Depending on the proportions and dimensions of the chamber, the number of sleeves evidently may be smaller or larger. The combining nozzle 4 consists of two truncated-cone sleeves 41 and 42.

The consecutive elements 1, 31, 32, 33 and 41 are successively joined by means of connecting rings respectively labeled 51, 52, 53 and 54. The consecutive elements 1, 34, 35, 36 and 42 are joined by means of connecting rings respectively labeled 55, 56, 57 and 58. Each ring consists of a ring-shaped web connecting two cylindrical flanges. The same criterion will be used to distinguish between the outer flange and the inner flange of each ring and between the facings of each sleeve. The inner flange of rings 51 and 55 extends forward and rearward from the web and their outer flange extends on the rearward side only. Both the inner and outer flanges of the other rings extend forward and rearward from their webs; that is, the said rings have an H section.

The inner and outer walls of sleeves 31, 32, 33, 34, 35 and 36 are connected by multiple ribs labelled respectively 61, 62, 63, 64, 65 and 66, which delimit an equal number of air circulation channels. As shown in FIG. 2, each sleeve — say sleeve 32, for example — can advantageously consist of a composite metallic material whose two facings 321 and 322 are braced by a welded corrugated strip 323 (ribs 62 of FIG. 1). The construction of the chamber is thereby significantly simplified and lightened without affecting its rigidity.

The front sleeves 31 and 34 are provided with vents 81 and 84 to let in the primary combustion air. These vents are made airtight with respect to the channels between the facings by means of a turned-down lip in the outer facing. Vents 83 and 86 are similarly provided in rear sleeves 33 and 36 to let in the secondary combustion air and the dilution air.

As shown in FIG. 3 and the axial cross-section of FIG. 1, the ribs adjacent to the intake opening, such as ribs 61 adjacent to the sleeve 31, for example, are cut off to provide a passage (according to arrows F of FIG. 3) for the flow of the cooling air around the turned-down lip which delimits the vent. It can be seen that the arrangement, according to the invention, of the twin-facing wall of the chamber shell makes it possible to solve the sensitive problem of cooling the turned-down lip vents, by providing powerful cooling.

Returning to FIG. 1, consider now the assembly procedure of the sleeves and rings. The inner flange of ring 51 and the outer sleeve of the front head 1 have the same diameter and are assembled by welding. The outer wall of sleeve 31 and the outer flange of ring 51 have the same diameter and also are assembled by welding; the inner wall of sleeve 31, whose diameter is approximately equal to the average of the diameters of the flanges of ring 51, stops at a distance from the web of this ring.

As for ring 52, the diameter of its inner flange is equal to the diameter of the inner facing of the front sleeve 31. These two parts are joined by welding. The outer flange of ring 52, whose diameter is appreciably larger than that of the outer facing of sleeve 31, has the same diameter as the outer facing of the intermediate strake 32, to which it is joined by welding. Its forward portion projects frontwards around the outer facing of sleeve 31, while its rear portion, with a diameter significantly smaller than that of the inner wall of sleeve 32, projects rearwards within the latter.

The dimensioning and assembly of the sleeves and rings which comprise the chamber shell follow throughout the rule an example of which has been given above. That is to say, the front edge of the outer facing of each sleeve is welded to the rear edge of the outer flange, of the same diameter, of the ring located immediately forward of it, while the rear edge of the inner facing of the same sleeve is welded to the front edge of the inner flange, of the same diameter, of the ring located immediately to the rear. In addition, each inner facing stops at a distance from the web of the ring immediately to the front, whose inner flange projects rearwards past the said wall, while each outer facing stops at a distance from the web of the ring immediately to the rear, whose outer flange extends frontwards past the said wall.

It is thus seen that each sleeve offers to the air contained in the space between the housing and the chamber a divided annular passageway through which it flows from rear to front, but which begins at an annular slot which faces frontwards in the space between the housing and the chamber and opens into the interior of the chamber through an annular slot which faces rearwards.

Thus, each sleeve is cooled in three ways. The outer facing is cooled on the side of the space between the housing and the chamber by convection of the secondary air which flows from front to rear in the said space. A portion of the secondary flow then flows from rear to front between the two facings, cooling them by convection. Finally, the same portion of the flow licks the inner facing on the flame-tube side from front to rear, forming a protective surface film. Furthermore, this film is renewed at each section separating one sleeve from the next.

The rear combining nozzle 4 is cooled in the same manner as the sleeves.

It is noted that the annular chamber of FIG. 1 is divergent, given that the outside cross-sections become larger from front to rear from one strake to the next, while the inside cross-sections become smaller. FIG. 4 illustrates a variant in which the cross-sections remain substantially unchanged. It represents two sleeves which occupy analogous positions to those of sleeves 32 and 33 in FIG. 1 and which are labeled identically but with the addition of the subscript $a$. The only significant difference is that the diameters of rings 52$a$ and 53$a$ are identical, as are also the diameters of the forward sections of the sleeves 32$a$ and 33$a$ and the diameters of their rear sections. The geometric configuration of each sleeve thus comprises two cylindrical segments of different diameters connected by an appreciably conical segment.

We claim:

1. A combustion chamber shell, particularly for turbojet engines, wherein the said chamber is housed within a housing in which a current of air intended, on the one hand, to supply the combustion air and, on the other, to cool the walls of the said shell flows from front to rear and is of the type composed of sleeves whose diameters increase from front to rear and which have two facings, namely an outer one and an inner one, characterized by the fact that it contains between the sleeves annular connecting parts of H section which consist of a web joining two cylindrical flanges, namely, an inner one and outer one, each of which has a free edge, each such free edge forming, respectively, with the outer facing of the sleeve located to the front and with the inner facing of the sleeve located to the rear, an annular intake channel section which faces frontwards and an annular discharge channel section which faces rearwards, in such a fashion that the said current of air first cools by convection the outer facing, then, after reversing direction, cools the inner facing, and finally protects the inner facing by the surface film effect.

2. A combustion chamber shell according to claim 1, characterized by the fact that the sleeves are made of composite metallic material consisting of two sheets connected and braced to each other by a corrugated strip whose corrugations are aligned longitudinally so as to form the channels.

3. A combustion chamber shell according to claim 1, containing vents for the supply of secondary air in a radial direction, which are formed in the outer facing of the wall of the said shell and are delimited by a rim bent toward the interior of the chamber shell, characterized by the fact that the height of the said rim is substantially equal to the separation between the two wall facings and that the longitudinal bracing ribs are cut off at a position spaced from the periphery of the said rim so as to provide for passage of a current of cooling air around the said rim.

* * * * *